United States Patent
Chen et al.

(10) Patent No.: US 7,620,841 B2
(45) Date of Patent: Nov. 17, 2009

(54) RE-UTILIZING PARTIALLY FAILED RESOURCES AS NETWORK RESOURCES

(75) Inventors: Dong Chen, Croton On Hudson, NY (US); Alan Gara, Mount Kisco, NY (US); Philip Heidelberger, Cortlandt Manor, NY (US); Thomas Alan Liebsch, Rochester, MN (US); Burkhard Steinmacher-Burow, Baden-Wuerttemburg (DE); Pavlos Michael Vranas, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 11/335,784

(22) Filed: Jan. 19, 2006

(65) Prior Publication Data

US 2007/0168695 A1    Jul. 19, 2007

(51) Int. Cl.
*G06F 11/00* (2006.01)
(52) U.S. Cl. .............................. 714/4; 714/10; 709/226
(58) Field of Classification Search .................... 714/4, 714/10, 13
See application file for complete search history.

(56) References Cited

U.S. PATENT DOCUMENTS

| | | | | |
|---|---|---|---|---|
| 5,113,523 A | * | 5/1992 | Colley et al. ................... 712/12 |
| 5,386,551 A | * | 1/1995 | Chikira et al. ................. 714/46 |
| 5,408,646 A | * | 4/1995 | Olnowich et al. .............. 714/4 |
| 5,592,610 A | * | 1/1997 | Chittor .......................... 714/4 |
| 5,898,826 A | * | 4/1999 | Pierce et al. ................... 714/4 |
| 6,516,372 B1 | * | 2/2003 | Anderson et al. ........... 710/300 |
| 6,684,343 B1 | * | 1/2004 | Bouchier et al. .............. 714/4 |
| 6,718,483 B1 | * | 4/2004 | Kimura ........................ 714/10 |
| 6,883,108 B2 | * | 4/2005 | Lee et al. ....................... 714/4 |
| 6,918,052 B2 | * | 7/2005 | Bouchier et al. .............. 714/4 |
| 2005/0172164 A1 | * | 8/2005 | Fox et al. ...................... 714/13 |
| 2006/0010344 A1 | * | 1/2006 | Zorek et al. ................... 714/13 |
| 2008/0091974 A1 | * | 4/2008 | Nakashima ................... 714/10 |

\* cited by examiner

*Primary Examiner*—Emerson C Puente
*Assistant Examiner*—Elmira Mehrmanesh
(74) *Attorney, Agent, or Firm*—Martin & Associates LLC; Bret J. Petersen

(57) ABSTRACT

A method and apparatus for re-utilizing partially failed compute resources in a massively parallel super computer system. In the preferred embodiments the compute node comprises a number of clock domains that can be enabled separately. When an error in a compute node is detected, and the failure is not in network communication blocks, a clock enable circuit enables the clocks to the network communication blocks only to allow the partially failed compute node to be re-utilized as a network resource. The computer system can then continue to operate with only slightly diminished performance and thereby improve performance and perceived overall reliability.

15 Claims, 3 Drawing Sheets

US 7,620,841 B2

RE-UTILIZING PARTIALLY FAILED RESOURCES AS NETWORK RESOURCES

BACKGROUND OF THE INVENTION

1. Technical Field

This invention generally relates to massively parallel computing systems and development, and more specifically relates to re-utilizing partially failed compute resources as network resources.

2. Background Art

Supercomputers continue to be developed to tackle sophisticated computing jobs. These computers are particularly useful to scientists for high performance computing (HPC) applications including life sciences, financial modeling, hydrodynamics, quantum chemistry, molecular dynamics, astronomy and space research and climate modeling. Supercomputer developers have focused on massively parallel computer structures to solve this need for increasingly complex computing needs. A family of such massively parallel computers is being developed by International Business Machines Corporation (IBM) under the name Blue Gene. The Blue Gene/L system is a scalable system in which the current maximum number of compute nodes is 65,536. The Blue Gene/P system is a scalable system in which the maximum projected number of compute nodes is 73,728. The Blue Gene/P node consists of a single ASIC (application specific integrated circuit) with 4 CPUs and memory. The full computer would be housed in 72 racks or cabinets with 32 node boards in each.

The Blue Gene/P supercomputer communicates over several communication networks. The 73,728 computational nodes are arranged into both a logical tree network and a logical 3-dimensional torus network according to the prior art. The logical tree network connects the computational nodes in a binary tree structure so that each node communicates with a parent and two children. The torus network logically connects the compute nodes in a lattice like structure that allows each compute node 110 to communicate with its closest 6 neighbors. Since the compute nodes are arranged in a torus and tree network that require communication with adjacent nodes, a hardware failure of a single node in the prior art can bring a large portion of the system to a standstill until the faulty hardware can be repaired. This catastrophic failure occurs because a single node failure would break the network structures and prevent communication over these networks. For example, a single node failure would isolate a complete section of the torus network, where a section of the torus network in the Blue Gene/P system is a half a rack or 512 nodes.

On a massively parallel super computer system like Blue Gene, the mean time before failure of a hardware component may be measured in hours while the complex computing programs describe above may take several hours to several days to run. Thus it is advantageous to be able to continue to operate the system if there is a failure of an individual compute node or processor to decrease the overall system down time. A parallel computer system could potentially be capable of processing with only slightly diminished capability when a single compute node has failed if the network structure is still viable. Without a way to utilize partially failed computer resources super computers will need to continue to halt all processing for all hardware failures thereby wasting potential computer processing time.

DISCLOSURE OF INVENTION

According to the preferred embodiments, a method and apparatus is described for re-utilizing partially failed compute resources in a massively parallel super computer system. In the preferred embodiments the compute node comprises a number of clock domains that can be enabled separately. When an error in a compute node is detected, and the failure is not in network communication blocks, a clock enable circuit enables only the clocks to the network communication blocks to allow the partially failed compute node to be re-utilized as a network resource. The computer system can then continue to operate with only slightly diminished performance and thereby improve performance and perceived overall reliability. In other embodiments, a control register in the net/bus arbiter block allows the compute node to be configure for network traffic and disable torus and tree network access from the CPU.

The disclosed embodiments are directed to the Blue Gene architecture but can be implemented on any parallel computer system with multiple processors arranged in a network structure. The preferred embodiments are particularly advantageous for massively parallel computer systems.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to an apparatus and method for re-utilizing failed compute resources on a massively parallel computer system. Embodiments herein allow the continued use of partially failed resources such as central processing units to increase efficiency of the computer system by reducing down time for hardware repair. The preferred embodiments will be described with respect to the Blue Gene/P massively parallel computer being developed by International Business Machines Corporation (IBM).

Figure 1:
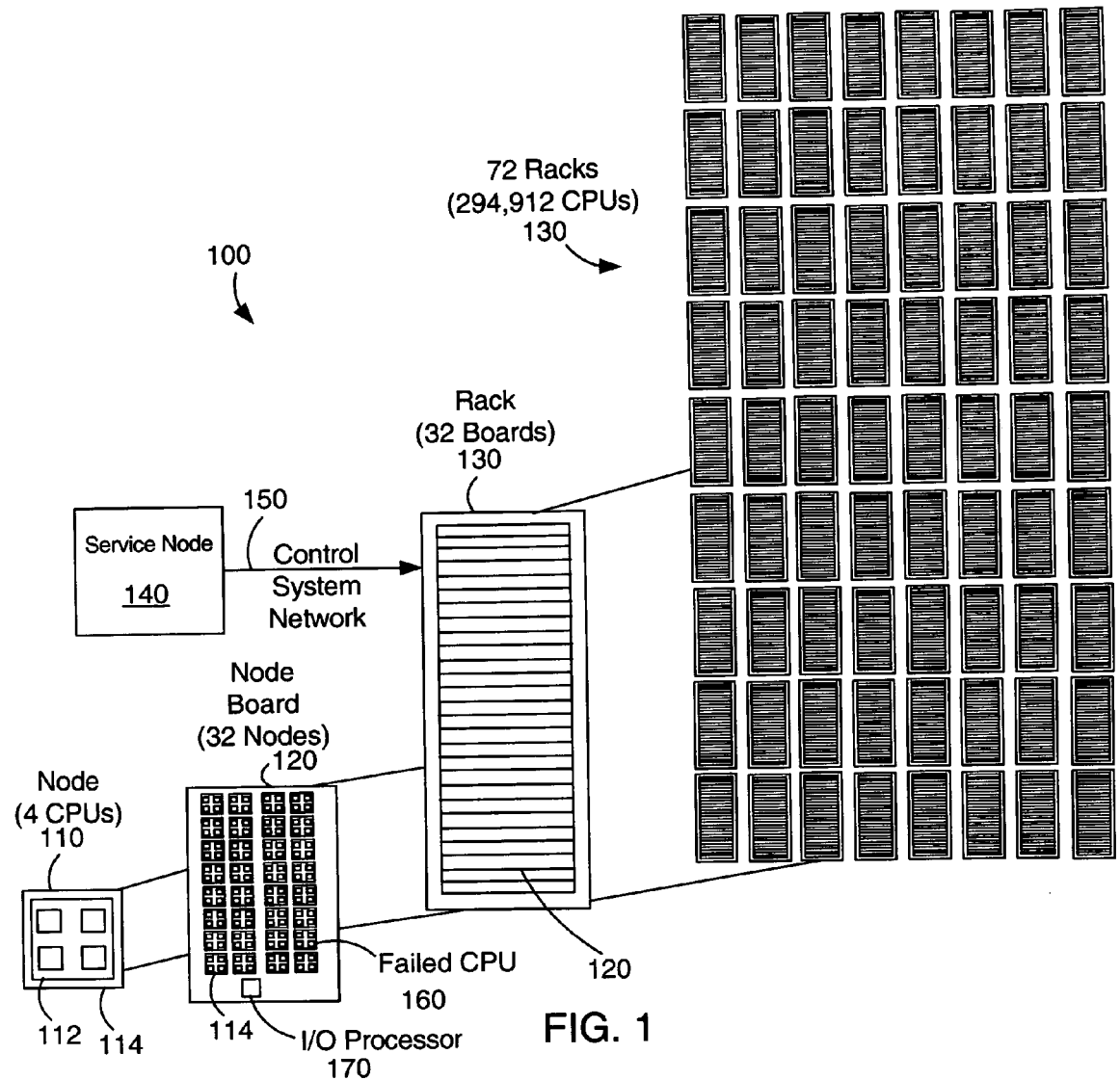
FIG. 1 is a block diagram of a massively parallel computer system according to preferred embodiments.

FIG. 1 shows a block diagram that represents a massively parallel computer system 100 such as the Blue Gene/P computer system. The Blue Gene/P system is a scalable system in which the maximum number of compute nodes is 73728. Each node 110 consists of a single application specific integrated circuit (ASIC) 112 with 4 CPUs and memory on a node daughter card 114. Each node 110 typically has 512 megabytes of local memory. A node board 120 accommodates 32 node daughter cards 114 each having a node 110. Thus, each node board has 32 nodes, with 4 processors for each node, and the associated memory for each processor. A rack 130 is a housing that contains 32 node boards 120. The full Blue Gene/P computer system would be housed in 72 racks 130 or cabinets with 32 node boards 120 in each. The full system would then have 294,912 CPUs (72 racks×32 node boards×32 nodes×4 CPUs).

Again referring to FIG. 1, the computer system 100 includes a service node 140 that handles the loading of the nodes with software and controls the operation of the whole system. The service node 140 is typically a mini computer system that includes a control console (not shown). The service node 140 is connected to the racks 130 of compute nodes 110 with a control system network 150. The control system network 150 includes various network interfaces that provide the necessary communication for the massively parallel computer system. The network interfaces are described further below. An I/O processor 170 located on a node board 120 handles communication from the service node 160 to a number of nodes. In the Blue Gene/P system, an I/O processor 170 is installed on a node board 120 to communicate with 1024 nodes in a rack.

The Blue Gene/P supercomputer communicates over several communication networks. The 73,728 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. Further, the Blue Gene/P computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the tree network and also have functional wide area network capabilities through a gigabit ethernet network.

Other communication networks include a JTAG network and a Barrier network. The JTAG network provides communication for testing and control from the service node 140 over the control system network 150 as shown in FIG. 1. The barrier network uses the barrier communication block (224 in FIG. 2) to implement software barriers for synchronization of similar processes on the compute nodes to move to a different phase of processing upon completion of some task.

As described above, on a massively parallel super computer system the mean time before failure of a hardware component may be quite short. A hardware failure of a single processor in the prior art can bring a large portion of the system to a standstill until the faulty hardware can be replaced or repaired. According to the claimed embodiments the computer system is able to continue operating with the non-failed nodes in the system if there is a failure of an individual processor 160 as shown in FIG. 1 and further described below.

Figure 2:
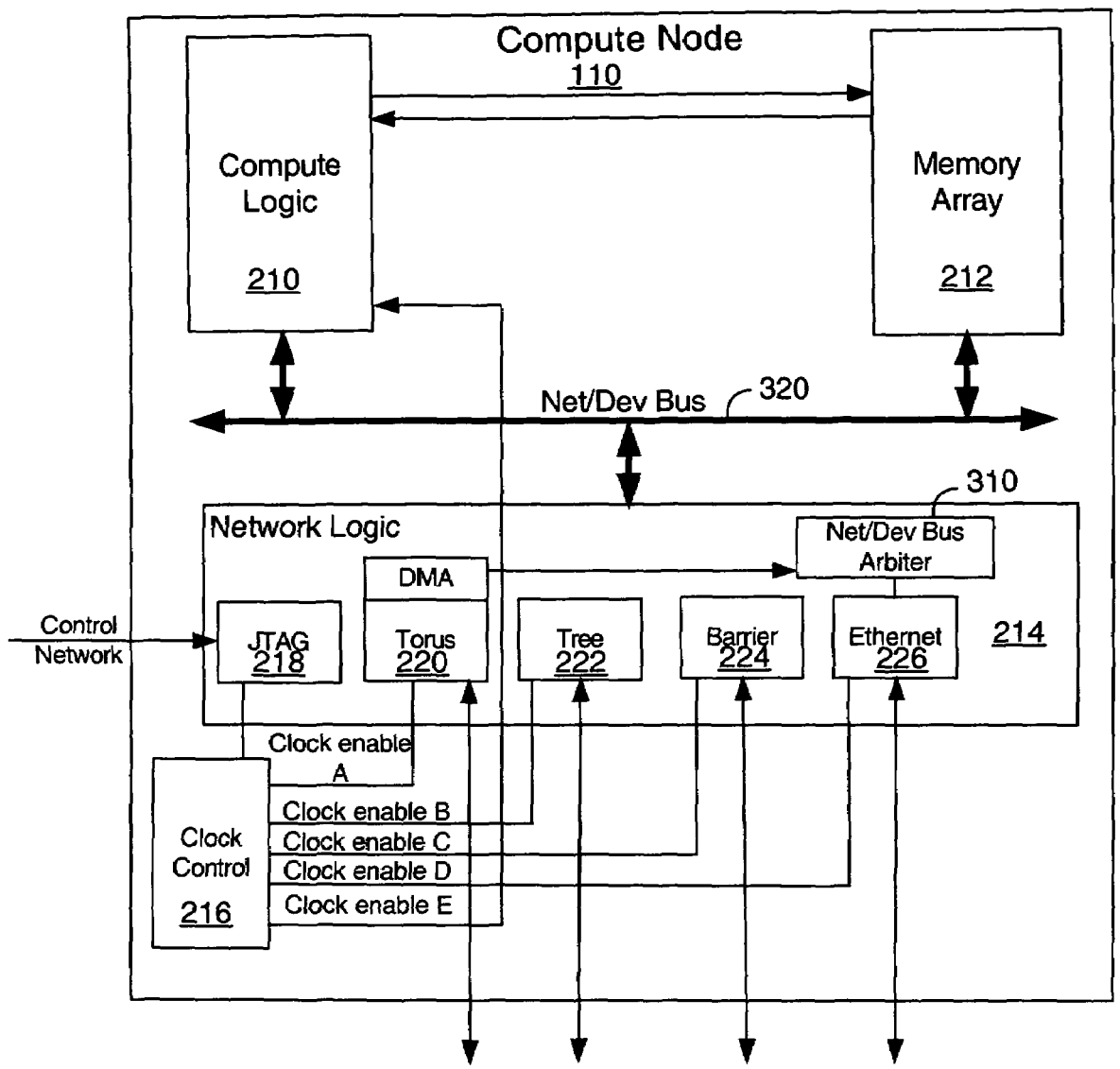
FIG. 2 is a block diagram of a compute node in a massively parallel computer system according to preferred embodiments.

FIG. 2 shows a block diagram that represents a compute node 110 of a computer system such as the Blue Gene/P computer system. The compute node 110 has compute logic 210 that would include the 4 CPUs for this node. The compute logic 210 of the compute node is connected to a memory array 212 for storing local data. The compute node 110 further includes a network logic block 214 that has communication logic for the compute node to communicate with the other nodes in the system and with the service node 140. Each compute node also includes a clock control circuit 216 to control the clocks of all the different blocks in the compute node. The clock control circuit is described further below.

Again referring to FIG. 2, the network logic block 214 of the compute node 110 includes logic to communicate over the communication networks. Specifically, the network logic block 214 includes a JTAG communication block 218, a torus communication block 220, a tree communication block 222, a barrier communication block 224 and an ethernet communication block 226.

The BlueGene/P compute node 110 has several separate clock domains or partitions where different areas of the compute node are operated with different clock signals. According to preferred embodiments, when diagnostics, such as built-in self test, detects that there is a partially failed compute resource then only the clock domains of the network control logic are enabled by enabling one or more clocks signals that form a set of clocks signals that drive the network control logic. Similarly, the clock domains of the compute logic blocks are disabled by disabling a set of clocks that drive the compute logic blocks. This allows the compute resource to continue to operate as a network resource in a network pass through mode or network resource mode. In the network resource mode, all network traffic from the torus or tree networks is routed appropriately to the next destination by the partially failed compute resource. The compute resource is partially failed, meaning it failed a hardware test, but the rest of the compute node is found to be useable as a network resource. A compute resource may be a CPU, or other non-network logic of the compute node 110.

In preferred embodiments, on power-up each clock domain in the compute node will have diagnostics run against it. If the diagnostics detect a failure in a CPU or other non-network logic block in the compute node 110, then power-on controlling software on the service node 140 will detect this failure over the control system network 150 and instruct the clock control 216 through the JTAG communication block 218 to enable only clocks to the domains the contain the network logic and not enable clocks to the partitions of the failed logic.

Again referring to FIG. 2, preferred embodiments include a network/device bus arbiter 310. The network device/bus arbiter is a logic block connected between the network logic 214 communication blocks and DevBus 230. The network device/bus arbiter functions to arbitrate access to the shared DevBus 230. The DevBus 230 is a communication bus on the compute node that carries communication signals between the various blocks of the compute node such as the compute logic block 210, the memory array 212 and the network logic blocks (i.e. the torus network communication block 220, the tree network communication block 222 and the ethernet communication block 226).

Figure 3:
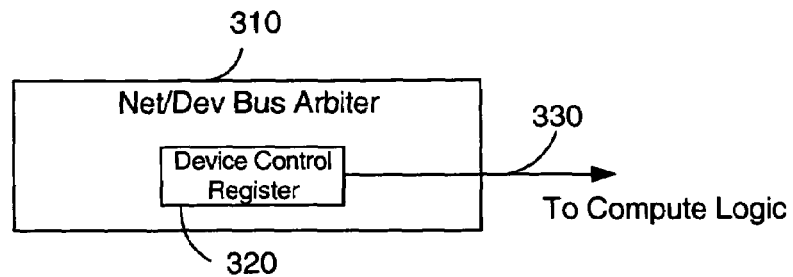
FIG. 3 is a block diagram of a net/dev bus arbiter in a massively parallel computer system according to preferred embodiments.

FIG. 3 shows a block diagram of the net/dev bus arbiter 310 according to preferred embodiments. The net/dev bus arbiter 310 includes a device control register 320 that has registers to enable control signals 330 to the various logic blocks including the compute logic 210 shown in FIG. 2 to control access the net/bus arbiter. When an error in a compute resource is detected, the network arbiter 310 is configured to only allow network traffic through the network logic 214 communication blocks. Access to the communication blocks, such as the torus and tree networks communication blocks, by the compute logic 210 is disabled by setting bits in the device control register 320. Thus the device control register 320 in the network arbiter 310 can be used to enable arbitration access to the compute logic blocks from the network connections and disabled arbitration from the failed compute resource that have been turned off to reduce the possibility of errors from the disabled resources.

Figure 4:
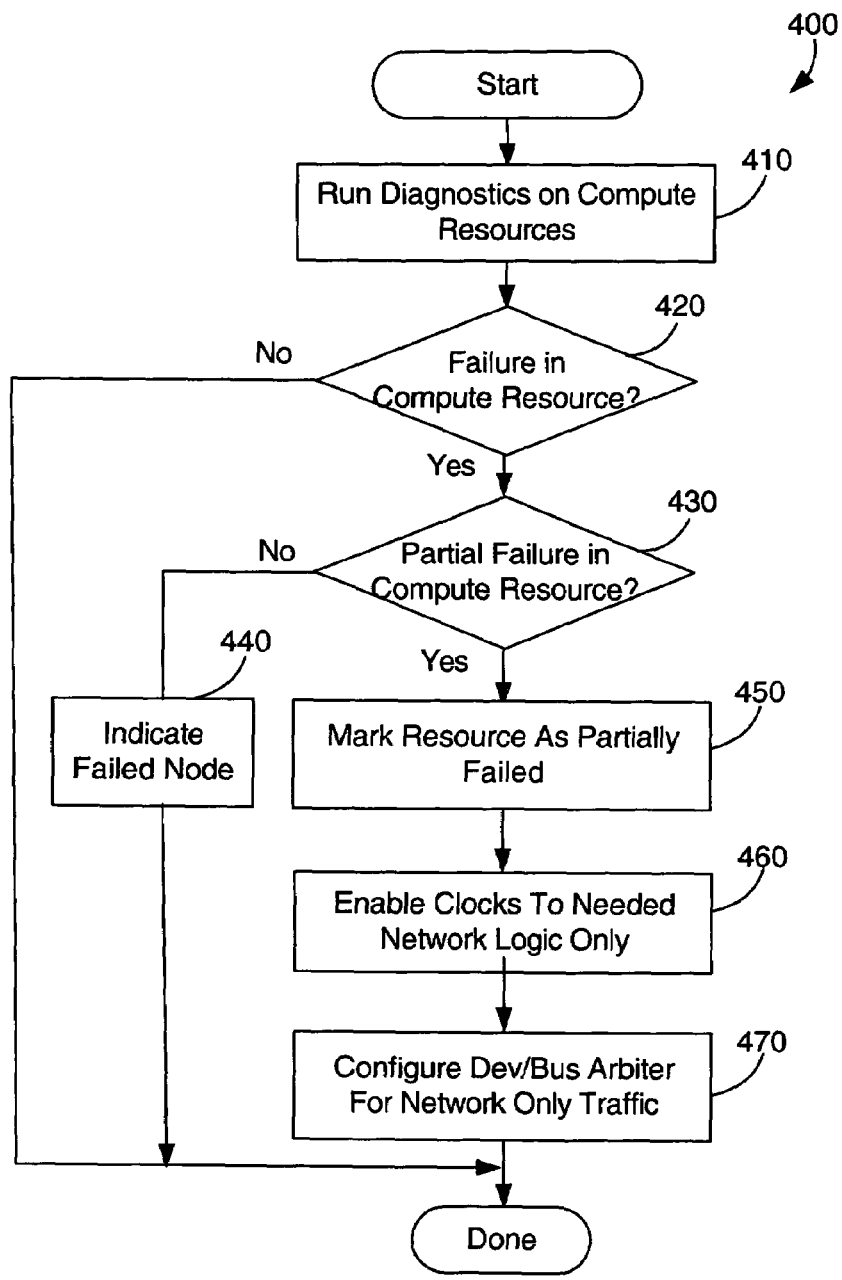
FIG. 4 is a method flow diagram for utilizing partially failed resources in a massively parallel computer system according to a preferred embodiment.

FIG. 4 shows a method 400 for re-utilizing partially failed compute resources in a massively parallel computer system according to embodiments herein. The first step of the method is to run diagnostics on the compute resources of the computer system (step 410). This step can be performed as has been done in the prior art. A determination is made if there is a failure in a compute resource (step 420). If there is no failure (step 420=no) then the method is done. If there is a failure (step 420=yes) then it is determined if it is a partial failure (step 430). A partial failure in a compute resource can be a failure in the CPU or other logic portion of the compute node but not in the network logic blocks that are needed to allow the compute node to communicate as a network resource. If the failure is not a partial failure (step 430=no) then the failure is a complete failure and the node is indicated as unusable (step 440) and the method is done. If there is a partial failure (step 430=yes) then the compute resource is marked as partially failed in the control system software operating in the service node (step 450). The clock enables are set by the clock control circuit to enable only the needed network logic of the failed network resource (step 460). In preferred embodiments, the method then also configures the dev/bus arbiter for network only traffic (step 470). The method of re-utilizing partially failed resources is then complete and the computer system can proceed with normal processing.

As described above, embodiments provide a method and apparatus for re-utilizing partially failed compute resources in a massively parallel super computer system. Embodiments herein can significantly decrease the amount of down time for increased efficiency of the computer system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A parallel computer system comprising:
    a plurality of compute nodes connected by a network, each compute node comprising:
        a) a compute logic block driven by a first set of clock signals;
        b) a network logic block driven by a second set of clock signals;
        c) a clock control circuit that selectively drives the first and second set of clock signals,
        wherein, in response to a detected failure in the compute logic block, the clock control circuit disables the first set of clock signals and enables the second set of clock signals to allow the network logic block to function in a network resource mode with a partial failure of the compute node due to the detected failure in the compute logic block; and
        wherein the network logic block in the network resource mode routes all network traffic to a next compute node in the network.

2. The parallel computer system of claim 1 further comprising a network/device bus arbiter that disables access to the communication blocks by the compute logic block when there is an error detected in the compute logic block.

3. The parallel computer system of claim 1 wherein the compute logic block comprises a CPU.

4. The parallel computer system of claim 1 wherein the clock control circuit enables clocks to clock partitions for a torus network communication block and a tree network communication block.

5. The parallel computer system of claim 1 wherein the error in the compute logic block is detected by a test executed on power-up under the control of a service node of the computer system.

6. The parallel computer system of claim 1 wherein the partial failure of the compute node is a failure of a CPU in the compute logic block.

7. A parallel computer system comprising:
    a plurality of compute nodes having a compute logic block comprising:
        a) a network logic block having communication blocks;
        b) a plurality of clock partitions in the compute node;
        c) a clock control circuit with unique clock enables for the clock partitions;
        d) a network/device bus arbiter that disables access to the communication blocks by the compute logic block when there is an error detected in the compute logic block; and
        wherein the clock control circuit enables clocks to clock partitions for one or more communication blocks and disables clocks to the compute logic block when there is an partial failure detected in the compute logic block to allow the computer system to continue to operate with the failed compute logic block by continuing to operate the network logic block in a network resource mode that routes network traffic to a next compute node in the network.

8. The parallel computer system of claim 7 wherein the compute logic block comprises a CPU.

9. The parallel computer system of claim 7 wherein the clock control circuit enables clocks to clock partitions for a torus network communication block and a tree network communication block.

10. The parallel computer system of claim 7 wherein the error in the compute logic block is detected by a test executed on power-up under the control of a service node of the computer system.

11. The parallel computer system of claim 7 wherein the partial failure of the compute node is a failure of a CPU in the compute logic block.

12. A computer implemented method for operating a parallel computer system with a partially failed compute node comprising the steps of:
    a) running diagnostics on compute resources to determine if there are partially failed resources; and
    b) enabling a clock to logic blocks that include network logic and not enabling a clock to failed logic blocks to enable network communication while disabling at least one failed compute resource to place the partially failed compute node in a network resource mode; wherein the network logic block in the network resource mode routes network traffic to a next compute node in the network.

13. The computer implemented method of claim 12 further comprising the step of configuring a net/dev bus arbiter for network only traffic.

14. The computer implemented method of claim 13 wherein the clock control circuit enables clocks to logic partitions for a torus network communication block and a tree network communication block.

15. The computer implemented method of claim 12 wherein the partial failure of the compute resource is a failure of a CPU.

* * * * *